United States Patent [19]

Ohsuga et al.

[11] Patent Number: 5,063,123
[45] Date of Patent: Nov. 5, 1991

[54] SEPARATOR FOR FUEL CELL

[75] Inventors: Masaru Ohsuga; Kaoru Takahashi, both of Iwata, Japan

[73] Assignee: Yamaha Hatsudoki Katushiki Kaisha, Iwata, Japan

[21] Appl. No.: 460,509

[22] Filed: Jan. 3, 1990

[30] Foreign Application Priority Data

Jan. 6, 1989 [JP] Japan .................................. 1-64400

[51] Int. Cl.$^5$ ............................................. H01M 8/04
[52] U.S. Cl. ..................................... 429/38; 427/115; 427/294
[58] Field of Search ..................... 429/36, 38; 427/115, 427/294

[56] References Cited

U.S. PATENT DOCUMENTS

| | | |
|---|---|---|
| 4,339,322 | 7/1982 | Balko et al. ........................ 429/38 X |
| 4,526,843 | 7/1985 | Kauffman et al. ................. 429/38 X |
| 4,728,533 | 3/1988 | Feigenbaum et al. ............. 429/35 X |
| 4,729,910 | 3/1988 | Fukuda et al. ...................... 427/294 |
| 4,732,637 | 3/1988 | Dettling et al. ................... 429/36 X |

Primary Examiner—Stephen J. Kalafut
Attorney, Agent, or Firm—Ernest A. Beutler

[57] ABSTRACT

A separator for use in a fuel cell having a fluoric synthetic resin within the pores of a separator base which makes the separator impermeable to reformed fuel and air. A process for manufacturing such a separator is also provided wherein the pores of the separator base are impregnated with fluoric synthetic resin, the base in dried, excess resin is removed from the base, and the resin within the separator pores is melted, to form a hardened fluoric synthetic resin within the separator base pores to prevent the reformed fuel and air from permeating the separator.

12 Claims, 3 Drawing Sheets

SEPARATOR FOR FUEL CELL

BACKGROUND OF THE INVENTION

This invention relates to a separator for a fuel cell, and more particularly to an improved construction and composition of a separator for the fuel cell and method for manufacturing the same.

It is well known that a fuel cell produces electrical energy from a reaction of an enriched or reformed fuel and oxygen. Hydrogen is typically used as the fuel and may be obtained by reforming a methanol-water mixture in a reformer that is comprised of a catalyst and a heater for vaporizing the unreformed fuel. Air is normally the source of oxygen for the fuel cell. Often times, a plurality of cell units are stacked in series so as to increase the output voltage generating capacity of the fuel cell.

One type of cell unit is comprised of an anode, a cathode, and an electrolyte matrix impregnated with an electrolyte such as phosphoric acid interposed between the anode and cathode.

Aqueous phosphoric acid is known to be an excellent electrolyte in that it is stable but has a low vapor pressure at temperatures of 200 degrees Celsius and is also a good conductor. Phosphoric acid also rejects carbon dioxide, and at temperatures of 200 degrees Celsius the anode is able to withstand carbon containing impurities such as carbon monoxide in the fuel gas.

Separators are used for separating the anode of one cell unit from the cathode of an adjacent cell unit and for electrically connecting the cell units in series. The separators typically include a plurality of fuel passages on the anode side and a plurality of air passages, perpendicular to the fuel passages, on the cathode side of the separator. These passages act to separate the inward flow of fuel and air from each other. Once inside the fuel cell, the fuel and air react to produce electrical energy through an exothermic electrochemical reaction. In operation of the fuel cell, a reformed hydrogen-rich gaseous fuel is fed through the fuel passages into the cell where it is oxidized, releasing electrons to the anode. Air is simultaneously delivered through the air passages and is reduced in the cell so as to consume electrons. As a result, the fuel cell stack generates a voltage.

To attain maximum efficiency and power output in a phosphoric acid fuel cell, each separator must be impermeable to the hydrogen fuel and air, be a good electrical conductor, and be able to withstand corrosion by concentrated phosphoric acid at temperatures of 200 degrees celsius and below. To achieve these objectives, it is desirable that the separator be made of an impermeable material. Such a separator can be formed from a pure block of carbon to achieve the desired impermeability; however, this method if very expensive. Another method is to form the separator by pressing and sintering a carbon powder substance. While this process is considerably less expensive than forming a separator from pure carbon block, it has a disadvantage of producing a separator with a porous structure which can be susceptible to permeation by the reformed hydrogen fuel and air. This decreases the efficiency and output of the fuel cell.

It is, therefore, a principal object of this invention to provide an improved fuel cell having a separator which is inexpensive to manufacture but is constructed so as to prevent the reformed fuel and air from permeating the separator.

It is a further object of this invention to provide a method for manufacturing a fuel cell separator which is impermeable to reformed fuel and air.

SUMMARY OF THE INVENTION

An improved fuel cell is provided for generating electrical energy from a reaction of a reformed fuel and air in the fuel cell. The fuel cell comprises one or more cell units and at least one separator positioned on either end or between the cell units. The separator has fuel passages and air passages through which fuel and air are supplied to the cell. The separator further includes a fluoric synthetic resin contained in the pores of the separator to prevent the reformed fuel and air from permeating the separator.

A method for manufacturing such a separator for use in a fuel cell is also provided, comprising the steps of impregnating pores in a separator base with particles of fluoric synthetic resin, drying the separator base and impregnated particles, removing excess resin particles from the separator base, and melting the resin particles impregnated within the separator base, so as to form a separator having a hardened fluoric synthetic resin within its pores to prevent the reformed fuel and air from permeating the separator.

BRIEF DESCRIPTION OF THE DRAWINGS

FIG. 4(a) illustrates the impregnating step;

FIG. 4(b) illustrates the drying step;

FIG. 4(c) illustrates the step of removing excess resin; and FIG. 4(d) illustrates the melting step.

DETAILED DESCRIPTION OF THE PREFERRED EMBODIMENTS

Figure 1:
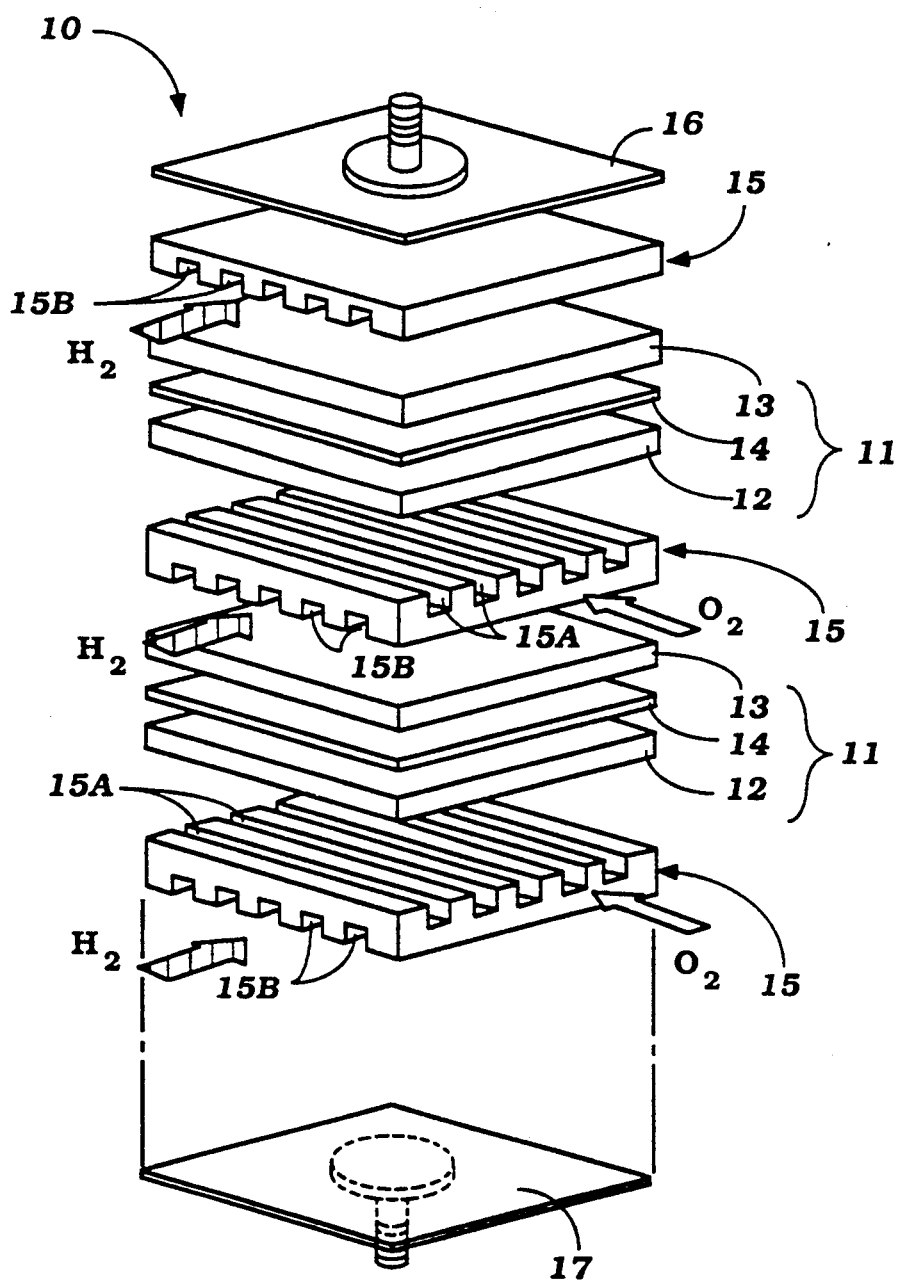
FIG. 1 shows a detailed sectional view of a fuel cell constructed in accordance with the invention.

Referring first to FIG. 1, a fuel cell is identified generally by the reference numeral 10. The fuel cell 10 depicted in the drawing is comprised of two cell units 11. However, it is to be understood that the invention can be utilized in conjunction with fuel cells having a different number of cell units including only one cell unit. Each cell unit 11 includes a cathode 12, an anode 13 and an electrolyte matrix 14 containing an electrolyte, preferably phosphoric acid. Both the cathode 12 and anode 13 are typically constructed of porous graphite and have a small amount of platinum catalyst on the surface facing the matrix 14. Separators identified generally by the reference numeral 15 are provided for separating the cathode 12 of one cell unit 11 from the anode 13 of an adjoining cell unit 11 or for separating a cell unit 11 from one of the current collector plates 16 or 17. The separators 15 also electrically connect the cell units 11 in series.

Each separator 15 has a plurality of air passages 15A on the cathode said of the separator 15. The separator 15 has a first set of ribs which define the sidewalls of the air passages 15A and also act to conduct electron flow from the separator 15 to the adjacent cathode 12. These air passages 15A and corresponding ribs permit oxygen from the air to be distributed to the cathode 12. On the anode side of each separator 15 are a plurality of fuel passages 15B, perpendicular to the air passages 15A, whose sidewalls are defined by a second set of ribs of the separator 15. These latter ribs permit electron flow from the anode 13 to the separator 15, and also act in connection with the fuel passages 15B to deliver a reformed hydrogen-rich gaseous fuel to the anode 13. An anode current collector plate 16 and a cathode current collector plate 17 ar provided at opposite ends of the fuel cell 10 for conducting current between the fuel cell 10 and a load.

In addition to being good electrical conductors, each separator 15 must be stable in the presence of fuel and be able to withstand corrosion by phosphoric acid at temperatures of 200 degrees Celsius and below. As previously noted, the separator 15 including its ribs must be impermeable to hydrogen gas and air, and for that reason, the separator 15 must be constructed of an impermeable material.

Figure 2:
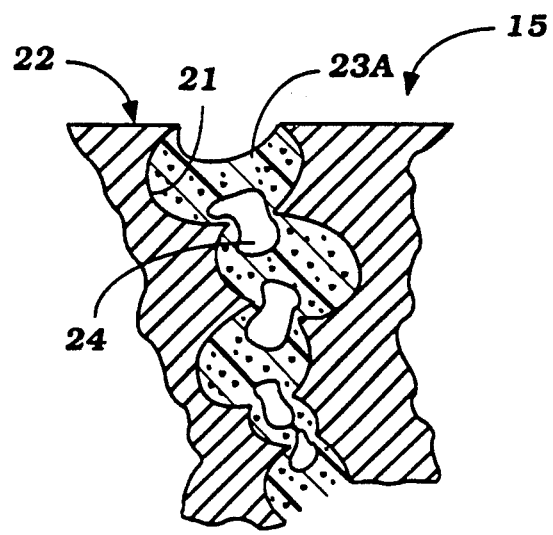
FIG. 2 is an enlarged cross-sectional view taken through a pore in a separator base containing a hardened fluoric synthetic resin in accordance with the invention.

FIG. 2 is a cross sectional view of the separator 15 taken through a pore 21 in the separator 15. The separator 15 has a base 22 of carbon powder which can be made by pressing and sintering a carbon powder. Contained with the pore 21 is a hardened fluoric synthetic resin 23A which makes the separator 15 impermeable to hydrogen rich gas and oxygen. Interspersed within the resin 23A are air bubbles 24.

Figure 3A:
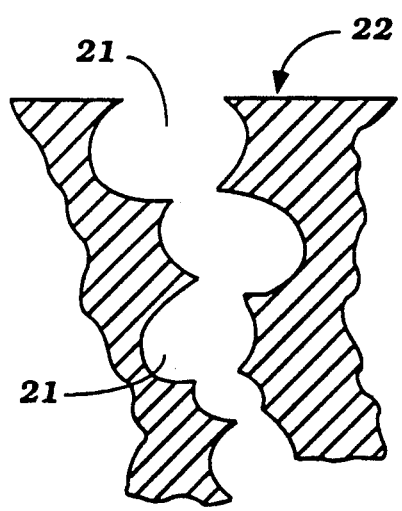
FIGS. 3(a) and (b) are enlarged cross-sectional views of a pore in a separator base before and after the pores are impregnated with particles of fluoric synthetic resin.
Figure 3B:
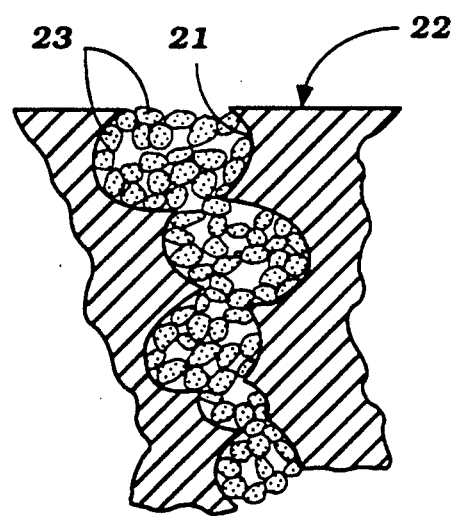

FIGS. 3(a) and (b) show the base 22 of the separator 15 before and after the pore 21 is impregnated with particles of fluoric synthetic resin 23. The fluoric synthetic resin 23 is comprised of an alkoxy fluoride resin which has a melting point of 300 degrees Celsius and/or an ethylene-propylene fluoride resin having a melting point of 250 degrees Celsius.

Referring now to FIGS. 4(a) through (d) a process for manufacturing the separator 15 is illustrated comprising the steps of (a) impregnating the pores 21 in the separator base 22 with particles of fluoric synthetic resin 23; (b) drying the separator base 22 and resin 23; (c) removing excess resin particles 23 from the separator base 22; and (d) melting the resin particles 23, so as to form a hardened fluoric synthetic resin 23A within the separator pores 21 which prevents reformed hydrogen fuel and air from permeating the separator 15.

Figure 4A:
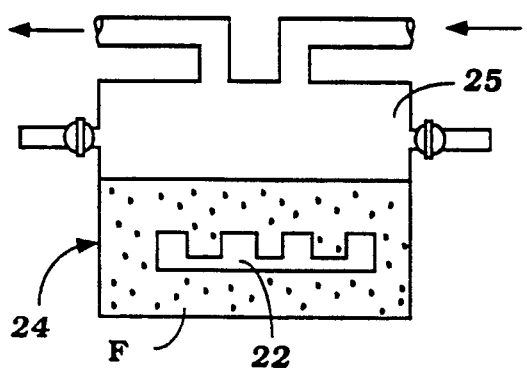
FIGS. 4(a) through (d) show a manufacturing process of the separator as follows.

In FIG. 4(a) the impregnating step is carried out in a vacuum chamber 24. The separator base 22 is immersed in a suspension of particles of fluoric synthetic resin in water (F). A vacuum pump (not shown) is connected to the chamber 24 so as to decompress the atmosphere 25 within the chamber 24 causing the suspension (F) to impregnate the pores 21 in the separator base 22.

Figure 4B:
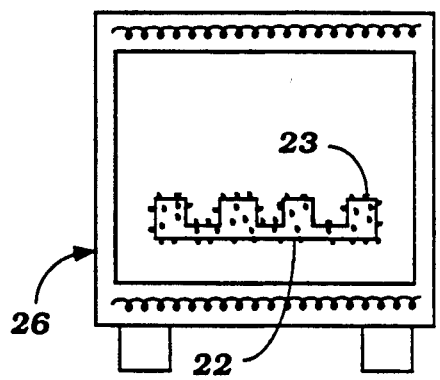

In FIG. 4(b) the separator base 22 is placed in a dryer 26 wherein the water is removed from the separator base 22 leaving behind the resin particles 23.

Figure 4C:
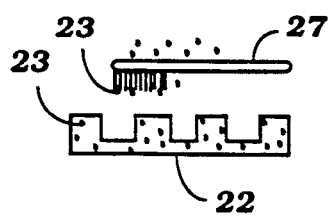

Referring now to FIG. 4(c) a brush 27 is used for removing the excess resin particles 23 which have accumulated on the surface of the separator base 22 so as to maintain electrical conductivity between the separator 15 and the adjoining cathode 12 or anode 13, or current collector plate 16 or 17.

Figure 4D:
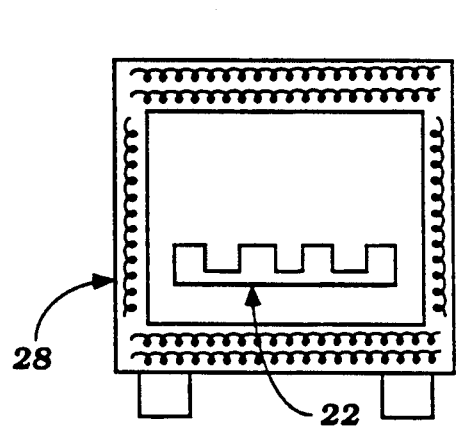

In FIG. 4(d) the separator base 22 is placed in a heater 28 so as to melt the fluoric synthetic resin particles 23 which have accumulated within the pores 21 of the separator base 22. After being melted, the resin particles 23 harden to make a separator 15 which is impermeable to hydrogen gas and air.

It should be readily apparent from the foregoing description that an improved composition of a separator for a fuel cell and a method for manufacturing the same have been disclosed which results in a separator which is impermeable to reformed fuel and air. Although two embodiments of the invention have been described and illustrated, various modifications may be made without departing from the spirit and scope of the invention, as defined by the appended claims.

We claim:

1. A fuel cell for generating electrical energy from a reaction of a reformed fuel and air in said fuel cell, comprising at least one cell unit, at least one separator of one piece construction positioned on either end of said cell unit, said separator having a plurality of fuel and air passages through which fuel and air are supplied to said cell, said separator further having a plurality of pores therein containing a fluoric synthetic resin making said separator impermeable to said reformed fuel and air.

2. A fuel cell as recited in claim 1, wherein said separator includes a base comprised of carbon.

3. A fuel cell as recited in claim 2, wherein said separator base is formed by pressing and sintering carbon powder.

4. A fuel cell for generating electrical energy from a reaction of a reformed fuel and air in said fuel cell, comprising a plurality of cell units, a plurality of separators positioned between said cell units, each of said separators being of one piece construction and having a plurality of fuel and air passages through which fuel and air are supplied to said cell, said separators further having a plurality of pores therein containing a fluoric synthetic resin making said separators impermeable to said reformed fuel and air.

5. A fuel cell as recited in claim 4, wherein each of said separators includes a base comprised of carbon.

6. A fuel cell as recited in claim 5, wherein the base of each of said separators is formed by pressing and sintering carbon powder.

7. A method of manufacturing a one piece separator for a fuel cell which generates electrical energy from a reaction of a reformed fuel and air in said fuel cell, comprising the steps of impregnating pores in a base of the separator with particles of fluoric synthetic resin, drying the separator base and impregnated particles, removing excess resin particles from the separator base, and melting the resin particles impregnated within the separator base, so as to form a separator having a hardened fluoric synthetic resin within its pores making said separator impermeable to the reformed fuel and air.

8. The method as recited in claim 7, wherein said impregnating step is carried out in a vacuum chamber.

9. The method as recited in claim 8, wherein during the impregnating step the separator base is immersed in a suspension of particles of fluoric synthetic resin in water within the vacuum chamber, and the atmosphere within the chamber is decompressed causing the suspension to impregnate the separator base.

10. The method as recited in claim 7, wherein said drying step is carried out in a dryer where the water is removed from the separator base.

11. The method as recited in claim 7, wherein said removing step is carried out with a brush to remove excess resin particles so as to maintain electrical conductivity of the separator.

12. The method as recited in claim 7, wherein said melting step is carried out in a heater.

* * * * *